US011988221B2

(12) United States Patent
Yan et al.

(10) Patent No.: US 11,988,221 B2
(45) Date of Patent: May 21, 2024

(54) REFRIGERANT COMPRESSOR WITH IMPELLER HAVING BLADES WITH WAVY CONTOUR

(71) Applicant: Danfoss A/S, Nordborg (DK)

(72) Inventors: Jin Yan, Tallahassee, FL (US); Tadeu Mendonca Fagundes, Tallahassee, FL (US); Ryan Dingman, Boca Raton, FL (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/994,453

(22) Filed: Nov. 28, 2022

(65) Prior Publication Data

US 2023/0235748 A1 Jul. 27, 2023

Related U.S. Application Data

(60) Provisional application No. 63/302,154, filed on Jan. 24, 2022.

(51) Int. Cl.
*F04D 29/28* (2006.01)

(52) U.S. Cl.
CPC ...... *F04D 29/284* (2013.01); *F05D 2240/303* (2013.01); *F05D 2240/304* (2013.01)

(58) Field of Classification Search
CPC ....... F04D 29/284; F04D 29/30; F04D 29/242
See application file for complete search history.

(56) References Cited

U.S. PATENT DOCUMENTS

| | | | | |
|---|---|---|---|---|
| 9,638,208 | B2 * | 5/2017 | Tomita | F04D 29/284 |
| 11,143,193 | B2 * | 10/2021 | Yan | F04D 17/10 |
| 2013/0266450 | A1 | 10/2013 | Tomita et al. | |
| 2016/0281732 | A1 * | 9/2016 | Lardy | F04D 29/4213 |
| 2017/0335858 | A1 | 11/2017 | Okabe et al. | |
| 2023/0051249 | A1 * | 2/2023 | Martensson | F04D 29/324 |

FOREIGN PATENT DOCUMENTS

JP 648269 B2 6/1994

OTHER PUBLICATIONS

Harada, H, Performance characteristics shrouded and unshrouded impellers of a certified compressor. 1985.

* cited by examiner

*Primary Examiner* — Sabbir Hasan
(74) *Attorney, Agent, or Firm* — Carlson, Gaskey & Olds, P.C.

(57) ABSTRACT

This disclosure relates to a refrigerant compressor including an impeller. The impeller has a blade with a wavy contour. The wavy contour reduces flow separation relative to smooth, non-wavy blades. In particular, the disclosed wavy contour creates smaller trailing edge vortexes adjacent the blades. In turn, the wavy contour of the blades improves overall compressor efficiency.

18 Claims, 8 Drawing Sheets

REFRIGERANT COMPRESSOR WITH IMPELLER HAVING BLADES WITH WAVY CONTOUR

RELATED APPLICATIONS

This application claims the benefit of U.S. Provisional Application No. 63/302,154, filed Jan. 24, 2022, the entirety of which is herein incorporated by reference.

BACKGROUND

Refrigerant compressors are used to circulate refrigerant in a chiller via a refrigerant loop. Refrigerant loops are known to include a compressor, a condenser, an expansion device, and an evaporator. The compressor compresses the fluid, which then travels to the condenser, which in turn cools and condenses the fluid. The refrigerant then goes to the expansion device, which decreases the pressure of the fluid, and to the evaporator, where the fluid is vaporized, completing a refrigeration cycle.

Many refrigerant compressors are centrifugal compressors and have an electric motor that drives at least one impeller to compress refrigerant. Fluid flows into the impeller in an axial direction, and is expelled radially from the impeller.

SUMMARY

In some aspects, the techniques described herein relate to a refrigerant compressor, including: an impeller including a blade with a wavy contour.

In some aspects, the techniques described herein relate to a refrigerant compressor, wherein the wavy contour substantially follows a sine wave.

In some aspects, the techniques described herein relate to a refrigerant compressor, wherein the wavy contour follows a streamwise direction.

In some aspects, the techniques described herein relate to a refrigerant compressor, wherein a side surface of the blade gradually and smoothly oscillates by a peak amplitude relative to an average thickness of the blade.

In some aspects, the techniques described herein relate to a refrigerant compressor, wherein the average thickness of the blade varies along a length of the blade.

In some aspects, the techniques described herein relate to a refrigerant compressor, wherein the peak amplitude is a maximum deviation of the side surface from the average thickness.

In some aspects, the techniques described herein relate to a refrigerant compressor, wherein the contour of the side surface exhibits an inflection point as the contour of the side surface intersects the average thickness.

In some aspects, the techniques described herein relate to a refrigerant compressor, wherein: the side surface is a first side surface of the blade, the blade includes a second side surface exhibiting a wavy contour, and the first and second side surfaces each exhibit maximum deviations and inflection points that aligned relative to a length of the blade.

In some aspects, the techniques described herein relate to a refrigerant compressor, wherein the peak amplitude is within a range of 1-5% of a maximum thickness of the blade.

In some aspects, the techniques described herein relate to a refrigerant compressor, wherein the peak amplitude is within a range of 2-3% of the maximum thickness.

In some aspects, the techniques described herein relate to a refrigerant compressor, wherein: the blade includes a first side surface and second side surface on an opposite side of the blade and the first side surface, and the wavy contour extends along each of the first and second side surfaces from a leading edge of the blade to a trailing edge of the blade.

In some aspects, the techniques described herein relate to a refrigerant compressor, wherein: the first and second side surfaces extend from a leading edge of the blade to a trailing edge of the blade, the first and second side surfaces extend between a root of the blade and a tip of the blade, and when viewed from a location outward of the tip of the blade, the wavy contour of the first and second side surfaces is visible.

In some aspects, the techniques described herein relate to a refrigerant compressor, wherein the blade exhibits the contour along an entirety of a distance between the root and the tip.

In some aspects, the techniques described herein relate to a refrigerant compressor, wherein: the impeller includes a plurality of main blades and first and second splitter blades between adjacent main blades, and each of the main blades and the first and second splitter blades includes a wavy contour.

In some aspects, the techniques described herein relate to a refrigerant compressor, wherein: the first splitter blade extends a first length between a leading edge and a trailing edge thereof, the second splitter blade extends a second length between a leading edge and a trailing edge thereof, the first length is greater than the second length, each main blade extends a third length between a leading edge and a trailing edge thereof, and the third length is greater than the first and second lengths.

In some aspects, the techniques described herein relate to a refrigerant compressor, wherein: the leading edges of the first splitter blade, the second splitter blade, and each main blade are staggered relative to one another, and the trailing edges of the first splitter blade, the second splitter blade, and each main blade are aligned relative to one another and are provided at a common radial distance from a rotational axis of the impeller and are coextensive with an exit of the impeller.

In some aspects, the techniques described herein relate to a refrigerant compressor, wherein: the leading edge of the first splitter blade is spaced-apart from the leading edge of each main blade by a distance within a range of 30-60% of the third length, and the leading edge of the second splitter blade is spaced-apart from the leading of the first splitter blade by a distance within a range of 30-60% of the first length.

In some aspects, the techniques described herein relate to a refrigerant system, including: a main refrigerant loop including a compressor, a condenser, an evaporator, and an expansion device, wherein the compressor includes an impeller including a blade with a wavy contour.

In some aspects, the techniques described herein relate to a refrigerant system, wherein: a side surface of the blade gradually and smoothly oscillates by a peak amplitude relative to an average thickness of the blade, the peak amplitude is a maximum deviation of the side surface from the average thickness, and the contour of the side surface exhibits an inflection point as the contour of the side surface intersects the average thickness.

In some aspects, the techniques described herein relate to a refrigerant system, wherein the side surface exhibits a peak amplitude within a range of 1-5% of a maximum thickness of the blade.

DETAILED DESCRIPTION

Figure 1:
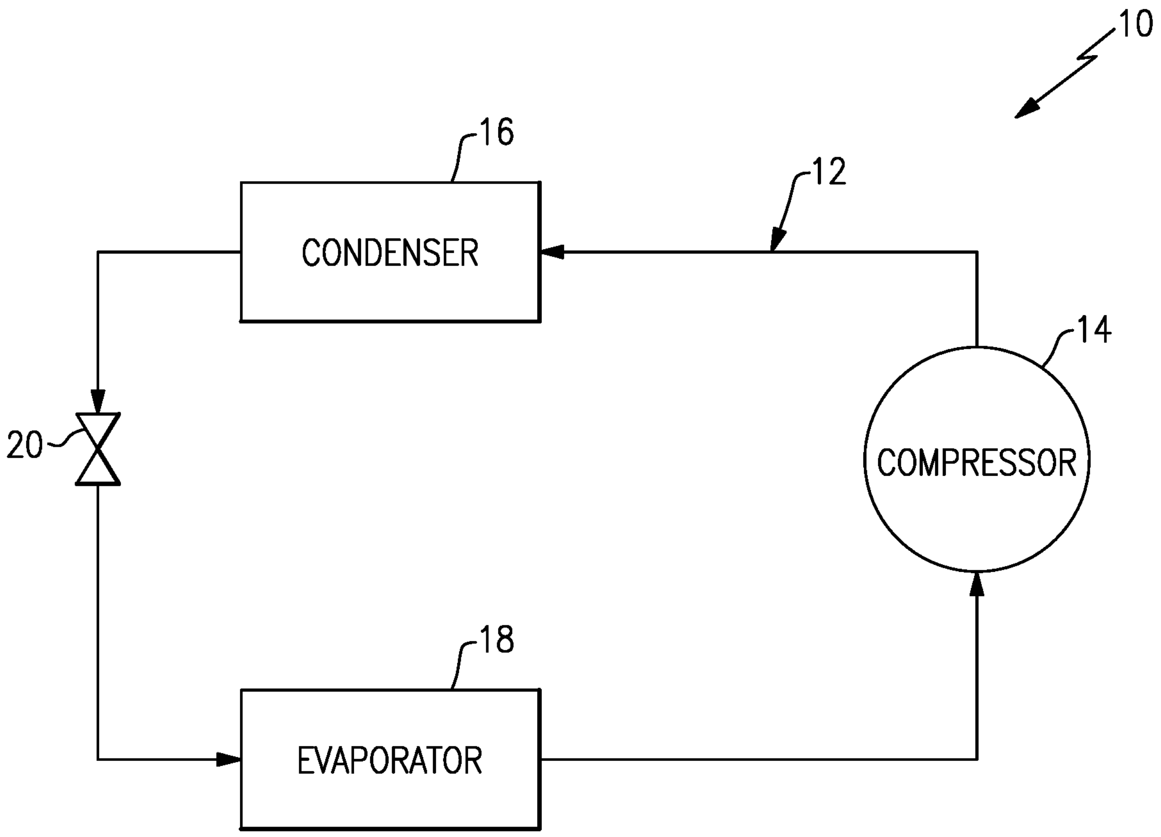
FIG. 1 schematically illustrates a refrigerant system.

FIG. 1 illustrates a refrigerant system 10. The refrigerant system 10 includes a main refrigerant loop, or circuit, 12 in communication with a compressor 14, a condenser 16, an evaporator 18, and an expansion device 20. This refrigerant system 10 may be used in a chiller, for example. In that example, a cooling tower may be in fluid communication with the condenser 16. While a particular example of the refrigerant system 10 is shown, this application extends to other refrigerant system configurations, including configurations that do not include a chiller. For instance, the main refrigerant loop 12 can include an economizer downstream of the condenser 16 and upstream of the expansion device 20.

Figure 2:
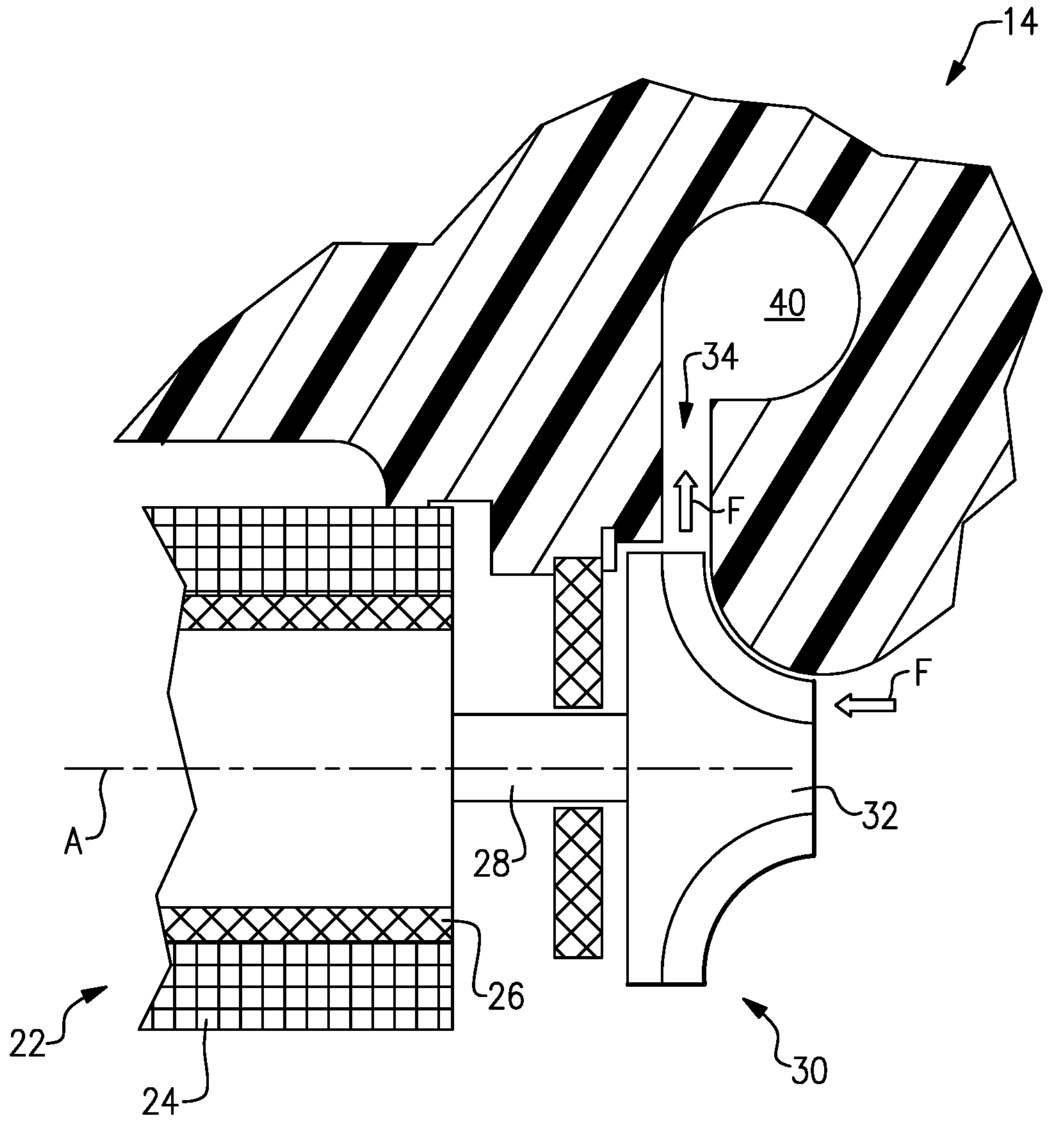
FIG. 2 is a schematic, partial cross-sectional view of a compressor.

FIG. 2 illustrates, in cross-section, a portion of the compressor 14. The compressor 14 includes an electric motor 22 having a stator 24 arranged radially outside of a rotor 26. The rotor 26 is connected to a shaft 28, which rotates to drive at least one compression stage 30 of the compressor 14, which in this example includes at least one impeller 32. The compressor 14 may include multiple compression stages.

The shaft 28 and impeller 32 are rotatable by the electric motor 22 about an axis A to compress refrigerant F. The terms axial, radial, and circumferential in this disclosure are used relative to the axis A. The shaft 28 may be rotatably supported by a plurality of bearing assemblies, which in one example are magnetic bearing assemblies.

During operation of the compressor 14, refrigerant F flows axially toward the impeller 32 and is expelled radially outwardly to a diffuser 34 downstream of the impeller 32. The diffuser 34 is arranged radially between the outlet of the impeller 32 and a volute 40. The volute 40 may be in fluid communication with the condenser 16 or another compression stage of the compressor 14.

Figure 3:
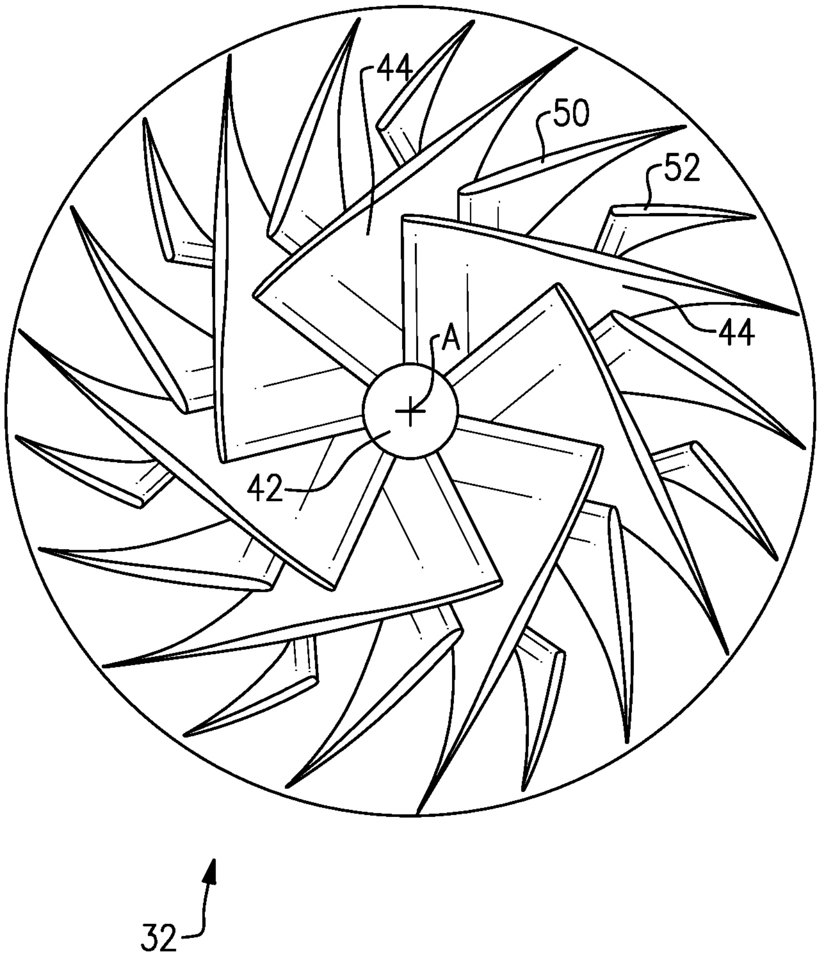
FIG. 3 is an axial end view of an example impeller.

FIG. 3 is an axial end view of the impeller 32 along the axis A. The impeller 32 is configured to rotate in a counter-clockwise direction, in this example. The impeller 32 is not shrouded in this example. However, the impeller 32 could be shrouded.

The impeller 32 includes a plurality of blades projecting radially outward from a hub 42. In particular, the impeller 32 includes a plurality of main blades 44 spaced-apart from one another circumferentially about the axis A. Two of the main blades 44 are labeled in FIG. 3. The impeller 32 includes seven total main blades 44 in the example of FIG. 3. This disclosure extends to impellers that include another number of main blades 44.

Figure 4:
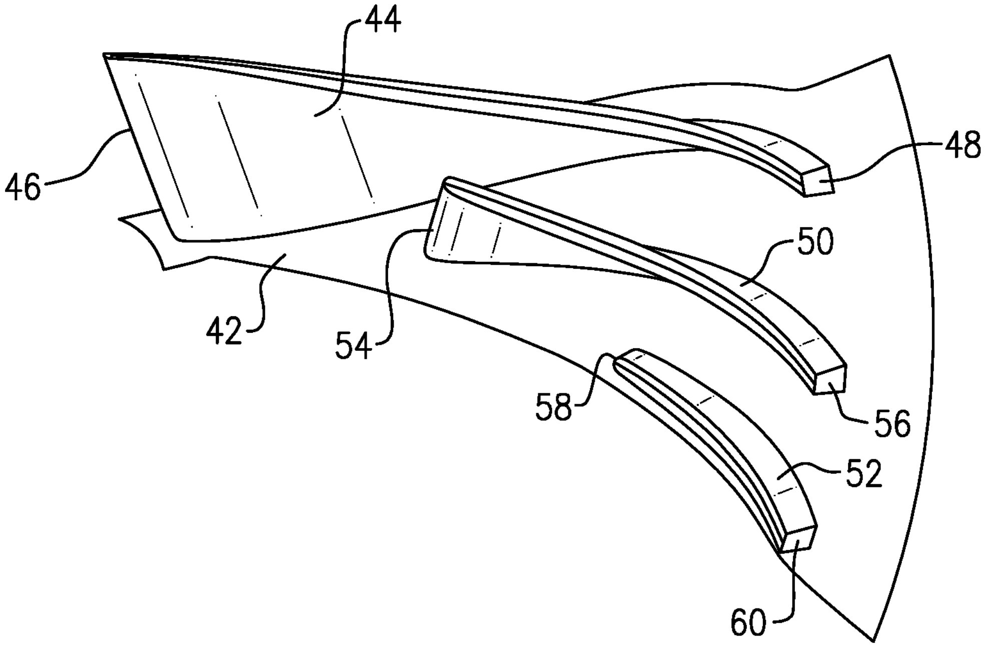
FIG. 4 is a cross-sectional illustration of a portion of the impeller, and in particular illustrates an exemplary blade arrangement, including a main blade, a first splitter blade, and a second splitter blade.
Figure 5:
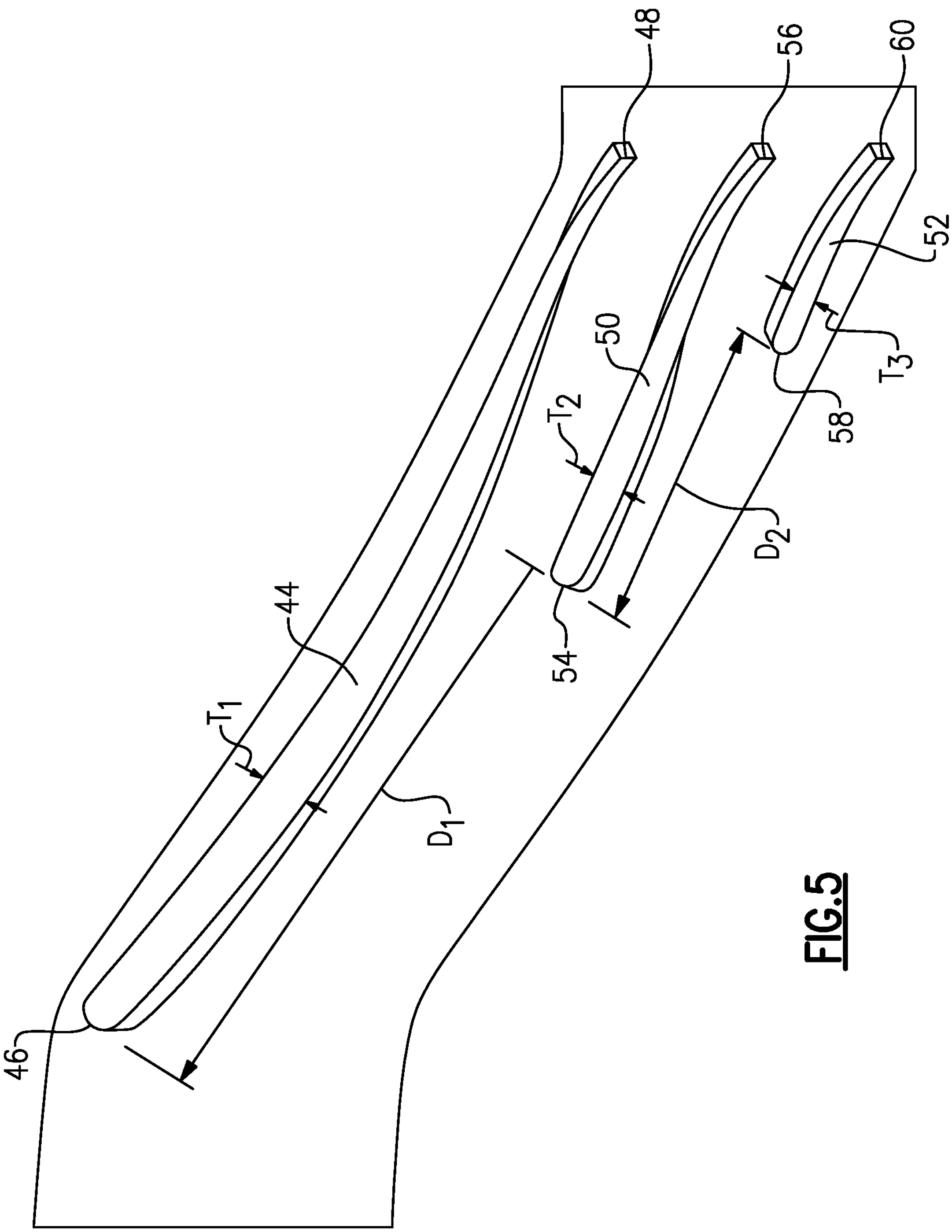
FIG. 5 is a blade-to-blade view of the blade arrangement.

With reference to FIGS. 4 and 5, the main blades 44 extend from a leading edge 46 adjacent an inlet to the impeller 32 to a trailing edge 48 adjacent an outlet of the impeller 32. The main blades 44 are configured to receive a flow of fluid flowing in an axial direction and to turn that flow such that it is radially expelled from the impeller 32.

Between each of the adjacent main blades 44, the impeller 32 includes first and second splitter blades 50, 52, in this example. The arrangement of a main blade 44, a first splitter blade 50, and a second splitter blade 52 is continued and repeated about the axis A.

The first splitter blade 50 extends between a leading edge 54 and a trailing edge 56. Likewise, the second splitter blade 52 extends between a leading edge 58 and a trailing edge 60.

The first and second splitter blades 50, 52 are shorter than the main blades 44. Specifically, a length of the first and second splitter blades 50, 52 between the respective leading and trailing edges is less than that of the main blades 44. Further, the second splitter blades 52 are shorter than the first splitter blades 50.

The main blades 44 and first and second splitter blades 50, 52 are staggered relative to one another along the impeller 32. In particular, with reference to FIG. 5, the leading edges 46, 54, 58 are spaced-apart from one another while the trailing edges 48, 56, 60 are aligned. In particular, the trailing edges 48, 56, 60 are provided at a common distance, namely a radial distance, away from the axis A. The trailing edges 48, 56, 60 are coextensive with the exit of the impeller 32, in this example.

Referring to FIG. 5, in this example, the leading edge 54 is spaced-apart from the leading edge 48 by a distance $D_1$ within a range of 30-60% of the overall length of the main blade 44. The leading edge 58 is spaced-apart from the leading edge 54 by a distance $D_2$ within a range of 30-60% of the overall length of the splitter blade 50. The lengths of the blades 44, 50, 52 are measured along their camber lines, in this example. The distances $D_1$, $D_2$ are measured parallel to the camber lines.

The first and second splitter blades 50, 52 extend parallel to the main blade 44, meaning their respective camber lines are parallel to one another. Further, the first splitter blade 50 exhibits a maximum thickness $T_2$ less than a maximum thickness $T_1$ of the main blade 44. The thicknesses $T_1$, $T_2$ are greater than the maximum thickness $T_3$ of the second splitter blade 52. Further, the leading edges 46, 54, 58 may be swept, and specifically inclined toward the trailing edges 48, 56, 60 in some examples.

The blade arrangement of this disclosure provides the impeller 32 with a balance between increasing the capacity of the compressor 14, by providing a relatively large throat between the adjacent main blades, while still also providing a relatively high pressure ratio, by providing two splitter blades between each main blade. This disclosure is particularly beneficial in the context of refrigerant compressors, and specifically those that use magnetic bearings.

Figure 6:
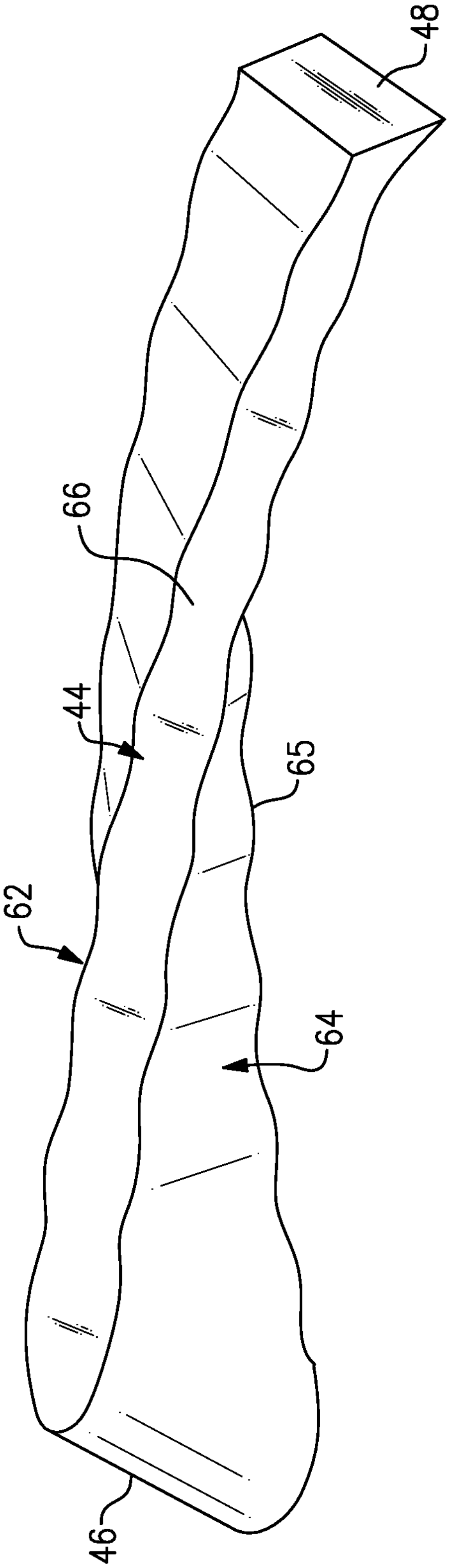
FIG. 6 illustrates additional detail of an example blade, and in particular illustrates the wavy contour of the blade.

FIG. 6 illustrates additional detail of an example blade, and in particular illustrates the wavy contour of the blade. While one example blade is shown in FIG. 6, it should be understood that this disclosure extends to impellers that include one or more blades having wavy contours. Specifically, FIG. 6 illustrates the main blade 44. While the main blade 44 is shown, this disclosure could apply to blades other than the main blade 44, and in particular can apply to impellers other than the specific impeller shown in FIGS. 3-5.

Figure 7:
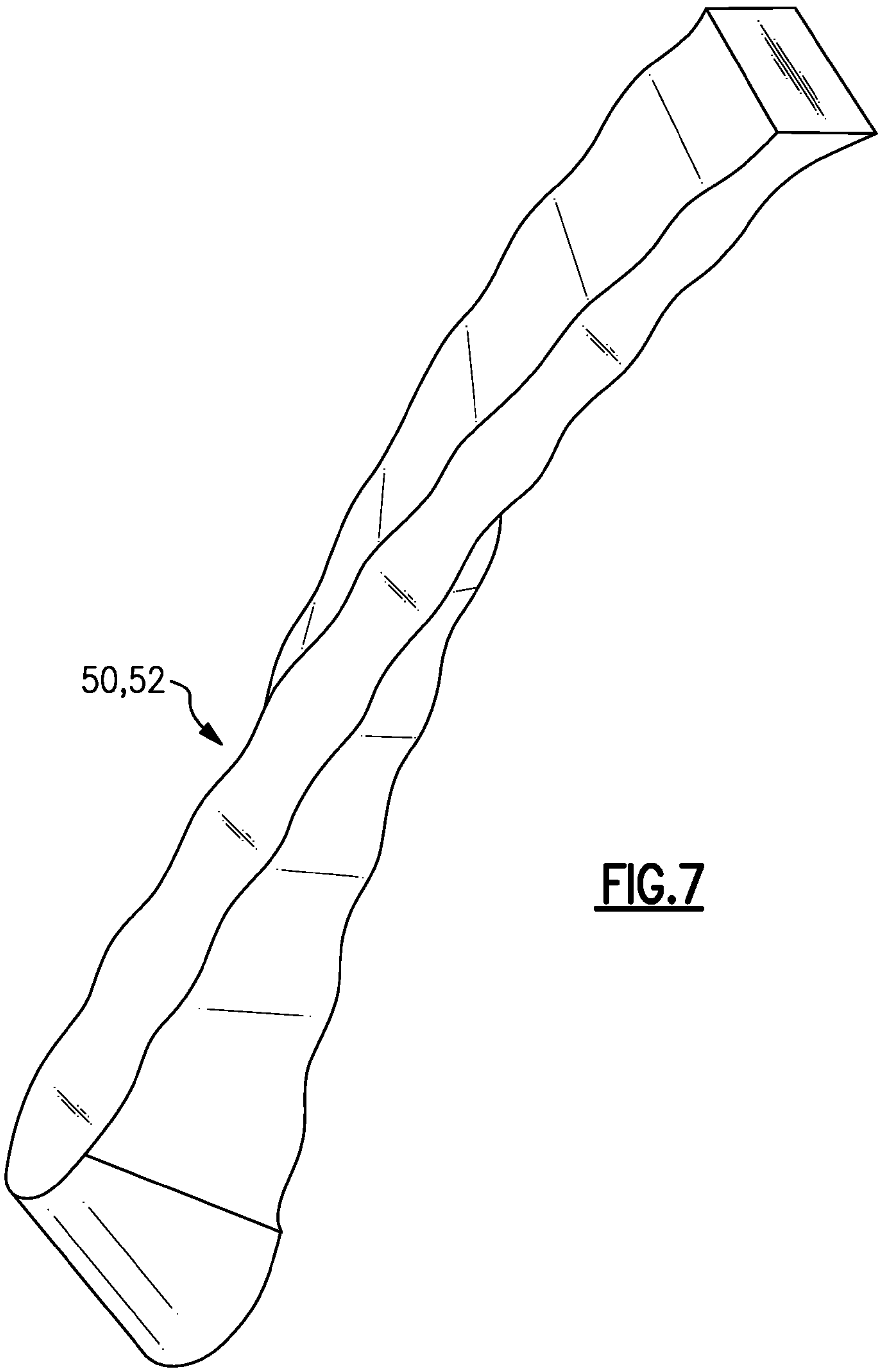
FIG. 7 illustrates additional detail of another example blade, and in particular illustrates the wavy contour of the blade.

In the example of FIG. 6, the main blade 44 includes first and second side surfaces 62, 64 on opposing sides of the main blade 44. The first and second side surfaces 62, 64 extend from the leading edge 46 to the trailing edge 48 and further extend between the root 65 and the tip 66 of the main blade 44. When viewed from a top of the main blade 44, meaning a location outward of the tip 66 of the main blade 44, a wavy contour of the first and second side surfaces 62, 64 is visible. The wavy contour substantially follows a sine wave and extends along each of the first and second side surfaces 62, 64 from the leading edge 46 to the trailing edge 48. Again, while the wavy contour is shown on the main blade 44 in FIG. 6, each of the blades 50, 52 could include the wavy contour. FIG. 7 is exemplary of blades 50, 52 including the wavy contour. FIGS. 6 and 7 are not drawn to scale, but are rather enhanced such that the example wavy contour is readily visible in the drawings. The relative proportions of the main blade 44 and the blades 50, 52 are best seen in FIGS. 4 and 5.

Figure 8:
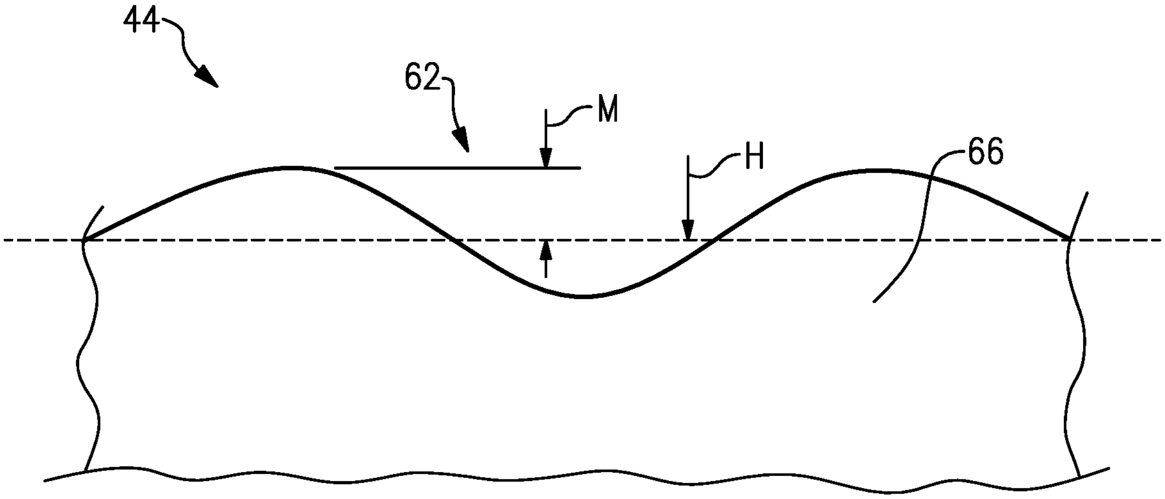
FIG. 8 is a partial, close-up view of a portion of an example blade having a wavy contour.

FIG. 8 is a partial, close-up view of a portion of the main blade 44. FIG. 8 is representative of a view of the main blade 44 from a top perspective. The main blade 44 may exhibit the contour of FIG. 8 along its entire height, meaning along the entirety of the distance between the root 65 and the tip 66.

In the example of FIG. 8, the wavy contour substantially follows a sine wave. The wavy contour also follows the streamwise direction, which is parallel to the flow path adjacent the main blade 44. As shown in FIG. 8, the first side surface 62 gradually and smoothly oscillates by a peak amplitude M relative to an average thickness H of the main blade 44. The second side surface 64 is arranged substantially identically to the first side surface 62. The average thickness H varies along the length of the main blade 44. However, the peak amplitude M, in one example, is constant along the entire length of the main blade 44. The peak amplitude M is the maximum deviation of the first side surface 62 from the average thickness H. As is the case in sine waves, the contour of the first side surface 62 exhibits an inflection point as it intersects the average thickness H. The maximum deviations and inflection points are aligned for both the first and second side surfaces 62, 64 relative to the length of the main blade 44, in one example.

In a particular example, the first side surface 62 exhibits a peak amplitude M within a range of 1-5% of the maximum thickness $T_1$ of the main blade 44. In a more specific example, the peak amplitude M is within a range of 2-3% of the maximum thickness $T_1$. Again, the second side surface 64 is arranged substantially similarly in one example.

The wavy contour of the blades disclosed herein reduces flow separation relative to smooth, non-wavy blades. In particular, the disclosed wavy contour creates smaller trailing edge vortexes adjacent the blades. In turn, the wavy contour of the blades improves overall compressor efficiency.

It should be understood that terms such as "axial" and "radial" are used above with reference to the normal operational attitude of a compressor. Further, these terms have been used herein for purposes of explanation, and should not be considered otherwise limiting. Terms such "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant compressor, comprising:
an impeller including a blade with a wavy contour, wherein the wavy contour substantially follows a sine wave, and wherein the wavy contour follows a streamwise direction.

2. The refrigerant compressor as recited in claim 1, wherein a side surface of the blade gradually and smoothly oscillates by a peak amplitude relative to an average thickness of the blade.

3. The refrigerant compressor as recited in claim 2, wherein the average thickness of the blade varies along a length of the blade.

4. The refrigerant compressor as recited in claim 2, wherein the peak amplitude is a maximum deviation of the side surface from the average thickness.

5. The refrigerant compressor as recited in claim 2, wherein the wavy contour of the side surface exhibits an inflection point as the wavy contour of the side surface intersects the average thickness.

6. The refrigerant compressor as recited in claim 5, wherein:
the side surface is a first side surface of the blade,
the blade includes a second side surface exhibiting a wavy contour, and
the first and second side surfaces each exhibit maximum deviations and inflection points that aligned relative to a length of the blade.

7. The refrigerant compressor as recited in claim 2, wherein the peak amplitude is within a range of 1-5% of a maximum thickness of the blade.

8. The refrigerant compressor as recited in claim 7, wherein the peak amplitude is within a range of 2-3% of the maximum thickness.

9. The refrigerant compressor as recited in claim 1, wherein:
the blade includes a first side surface and second side surface on an opposite side of the blade and the first side surface, and
the wavy contour extends along each of the first and second side surfaces from a leading edge of the blade to a trailing edge of the blade.

10. The refrigerant compressor as recited in claim 9, wherein:
the first and second side surfaces extend from a leading edge of the blade to a trailing edge of the blade,
the first and second side surfaces extend between a root of the blade and a tip of the blade, and
when viewed from a location outward of the tip of the blade, the wavy contour of the first and second side surfaces is visible.

11. The refrigerant compressor as recited in claim 10, wherein the blade exhibits the wavy contour along an entirety of a distance between the root and the tip.

12. The refrigerant compressor as recited in claim 1, wherein:
the impeller includes a plurality of main blades and first and second splitter blades between adjacent main blades, and
each of the main blades and the first and second splitter blades includes a wavy contour.

13. The refrigerant compressor as recited in claim 12, wherein:

the first splitter blade extends a first length between a leading edge and a trailing edge thereof, the second splitter blade extends a second length between a leading edge and a trailing edge thereof, the first length is greater than the second length, each main blade extends a third length between a leading edge and a trailing edge thereof, and the third length is greater than the first and second lengths.

14. The refrigerant compressor as recited in claim 13, wherein:

the leading edges of the first splitter blade, the second splitter blade, and each main blade are staggered relative to one another, and the trailing edges of the first splitter blade, the second splitter blade, and each main blade are aligned relative to one another and are provided at a common radial distance from a rotational axis of the impeller and are coextensive with an exit of the impeller.

15. The refrigerant compressor as recited in claim 14, wherein:

the leading edge of the first splitter blade is spaced-apart from the leading edge of each main blade by a distance within a range of 30-60% of the third length, and the leading edge of the second splitter blade is spaced-apart from the leading edge of the first splitter blade by a distance within a range of 30-60% of the first length.

16. A refrigerant system, comprising:

a main refrigerant loop including a compressor, a condenser, an evaporator, and an expansion device, wherein the compressor includes an impeller including a blade with a wavy contour, wherein the wavy contour substantially follows a sine wave, and wherein the wavy contour follows a streamwise direction.

17. A refrigerant system, comprising:

a main refrigerant loop including a compressor, a condenser, an evaporator, and an expansion device, wherein the compressor includes an impeller including a blade with a wavy contour, wherein a side surface of the blade gradually and smoothly oscillates by a peak amplitude relative to an average thickness of the blade, wherein the peak amplitude is a maximum deviation of the side surface from the average thickness, and wherein the wavy contour of the side surface exhibits an inflection point as the wavy contour of the side surface intersects the average thickness.

18. The refrigerant system as recited in claim 17, wherein the side surface exhibits a peak amplitude within a range of 1-5% of a maximum thickness of the blade.

* * * * *